US006192216B1

(12) United States Patent
Sabat, Jr. et al.

(10) Patent No.: US 6,192,216 B1
(45) Date of Patent: Feb. 20, 2001

(54) REMOTELY CONTROLLED GAIN CONTROL OF TRANSCEIVER USED TO INTER-CONNECT WIRELESS TELEPHONES TO A BROADBAND NETWORK

(75) Inventors: John Sabat, Jr., Merrimack, NH (US); Michael T. Dawson, Park City, UT (US)

(73) Assignee: Transcept, Inc., Manchester, NH (US)

( * ) Notice: Under 35 U.S.C. 154(b), the term of this patent shall be extended for 0 days.

(21) Appl. No.: 09/346,589

(22) Filed: Jul. 2, 1999

Related U.S. Application Data

(63) Continuation of application No. 08/998,874, filed on Dec. 24, 1997, now abandoned.

(51) Int. Cl.[7] .................................. H04H 1/00; H04B 1/40
(52) U.S. Cl. ............................. 455/5.1; 348/12; 455/88; 455/507
(58) Field of Search .................... 455/5.1, 3.3, 6.3, 455/507, 500, 501, 10, 9, 88; 348/12, 14

(56) References Cited

U.S. PATENT DOCUMENTS

| | | | |
|---|---|---|---|
| 5,381,459 | * | 1/1995 | Lappington ........................ 455/426 |
| 5,828,946 | * | 10/1998 | Feisullin et al. .................. 455/5.1 |
| 5,839,052 | * | 11/1998 | Dean et al. ...................... 455/5.1 |
| 5,867,763 | * | 2/1999 | Dean et al. ...................... 455/5.1 |
| 5,946,356 | * | 8/1999 | Felix et al. ...................... 455/88 |

OTHER PUBLICATIONS

Beasley, "The Advantages of Using Cable TV Distribution Plant for Linking PCS–Microcells", IEEE International Conference on Selected Topics in Wireless Communications, pp. 292–295, 1992.*

Donaldson et al., "Wireless Personal Communications Using CATV Distribution Networks", Canadian Conference on Electrical and Computer Engineering, pp. 995–999, 1993.*

Donaldson et al., "Wireless CATV Network Access for Personal Communications Using Simulcasting". IEEE Transactions on Vehicular Technology vol. 43 issue 3, pp. 666–671, Aug. 1994.*

* cited by examiner

Primary Examiner—Edward F. Urban
Assistant Examiner—Rafael Perez-Gutierrez
(74) Attorney, Agent, or Firm—Hamilton, Brook, Smith & Reynolds, P.C.

(57) ABSTRACT

Circuitry in central and remote transceivers is disclosed to monitor wireless telephone signal levels and control the settings of gain control circuitry in a plurality of remote transceivers that carry telephony signals between wireless telephones and the central transceiver via a broadband distribution network so that the central transceiver receives telephony signals from all remote transceivers within a given range of signal amplitude.

14 Claims, 4 Drawing Sheets

REMOTELY CONTROLLED GAIN CONTROL OF TRANSCEIVER USED TO INTER-CONNECT WIRELESS TELEPHONES TO A BROADBAND NETWORK

RELATED APPLICATIONS

The present application is a continuation of U.S. patent application Ser. No. 08/998,874 filed Dec. 24, 1997, now abandoned.

FIELD OF THE INVENTION

The present invention relates to wireless telephones and more particularly to apparatus for centrally controlling the operation and settings of gain control circuitry in remote transceivers that carry telephony signals between wireless telephones and a broadband distribution network that carries telephony signals to a telephone network.

BACKGROUND OF THE INVENTION

The prior art teaches the use of existing cable television network cables to carry telephony signals between a telephone network and remote transceiver sites in defined cells or sectors. The transceivers are used to establish wireless telephony communication links with wireless telephones that are operating within an area covered by each remote transceiver. To increase the number of wireless telephone subscribers that can use the wireless telephone system it has been suggested to decrease the size and operational range of each cell or sector, and to increase the number of cells or sectors required to provide wireless telephone service to a given area. Having cells or sectors of decreased size permits greater reuse of the limited number of frequency channels allocated for wireless telephone service because other cells or sectors located at a closer range can reuse the same frequency channels for additional calls without signal interference. The advantages of reducing cell or sector size to increase the call carrying capacity of the wireless telephone network is offset by the requirement for additional remote transceivers for the additional cells. This offset is minimized by utilizing an existing broadband distribution network to provide the communications path between remote transceivers in each of the cells or sectors and a central transceiver. The base transceiver station acts as the interface between the telephone network and the wireless telephone system, and the central transceiver acts as the wireless telephone system interface with the broadband distribution network.

To carry wireless telephony signals over a broadband distribution network, as described above, a predetermined bandwidth on the network is typically allocated for this purpose. However, as required, more bandwidth may be allocated to carry wireless telephony signals. To most efficiently use a given bandwidth to carry wireless telephony signals between wireless telephones and the telephone network, a combination of frequency and time division multiplexing is utilized. This requires base transceiver station equipment that acts as the interface with the telephone network and the wireless telephone system. With the base transceiver station equipment is a central transceiver (RASP), also called a Headend Interface Converter (HIC), that interfaces with the broadband distribution network, and it must function with telephony signals in the wide frequency spectrum of radio frequency signals on the telephone network, and up to 1000 Mhz over the broadband distribution network. This system also requires a plurality of remote transceivers, also called cable microcell integrators (CMIs) or Remote Antenna Drivers (RADs), in each of the cells or sectors that can carry many channels of telephony signals between the wireless telephones and the central transceiver via the broadband distribution network, without creating signal interference with the telephony signals in adjacent cells or sectors. In addition, the remote transceivers (RADs) must function with and translate telephony signals in the wide frequency spectrums of up to 1000 Mhz on the broadband distribution network and between 1850–1990 MHz for the radio link between remote transceivers and wireless telephones.

In addition, the remotely located transceivers and the broadband distribution network are exposed to numerous adverse conditions, such as temperature extremes, which adversely affect the power levels output from the transceivers, and affect losses and gains along the broadband distribution network. The power levels output from the remote transceivers must be constantly monitored and adjusted to compensate for these adverse conditions. In addition, such remote transceivers need to compensate not only for network variations between each remote transceiver and the central transceiver, but also for the temporal variations in the various network links between the remote and central transceivers.

SUMMARY OF THE INVENTION

Thus, there is a need in the art for transceivers or RADs for use in such a wireless telephony system to carry telephony signals between a telephone network and wireless telephones via a broadband distribution network along which are remotely distributed a plurality of the transceivers. The gain of these remote transceivers will be adjusted by the central transceiver which is monitoring the power level of signals received from each remote transceiver so that signals received from the wireless telephones are at a consistent level, that is within a relatively narrow acceptability range, when input to the central transceiver.

The above described need in the wireless telephone system prior art is satisfied by the present invention. A small transceiver is provided which is used in a wireless telephone system of the type briefly described above. These remotely located transceivers are used to carry telephony signals between wireless telephones and central transceivers via a broadband distribution network, such as HFC, fiber optic cable, or coaxial cable, on which the remote transceivers are hung and to which they are connected. Thus, these remote transceivers are remotely located and eliminate the need for prior art antenna towers to carry telephony signals between wireless telephones and central transceivers. Each remote transceiver has gain control circuitry by which the gain of the remote transceivers can be adjusted by the central transceiver which is monitoring the power level of a gain tone signal received from each remote transceiver. This is done so that the signal level of telephony signals from the wireless telephones and appearing at the input of the central transceiver are at a consistent level that is within a relatively narrow range acceptable to the central transceiver.

DESCRIPTION OF THE DRAWING

The invention will be better understood upon reading the following Detailed Description in conjunction with the drawing in which.

DETAILED DESCRIPTION

In the drawing and the following detailed description, all elements are assigned three digit reference numbers. The first digit of each reference number indicates in which figure of the drawing an element is located. The second and third digits of each reference number indicate specific elements. If the same element appears in more than one figure of the drawing, the second and third digits remain the same and only the first digit changes to indicate the figure of the drawing in which the element is located. As used herein the term "telephony signals" includes voice, data, fax and any other types of signals that are sent over a telephone network now or in the future. Throughout the Figures and the following description, reference is made, for one example, to a combined band pass filter and amplifier 325a. There are a number of other such combined band pass filters and amplifiers. They are shown and referenced this way for ease of presentation only. In reality they are each a discrete, separate filter the output of which is input to an amplifier.

Figure 1:
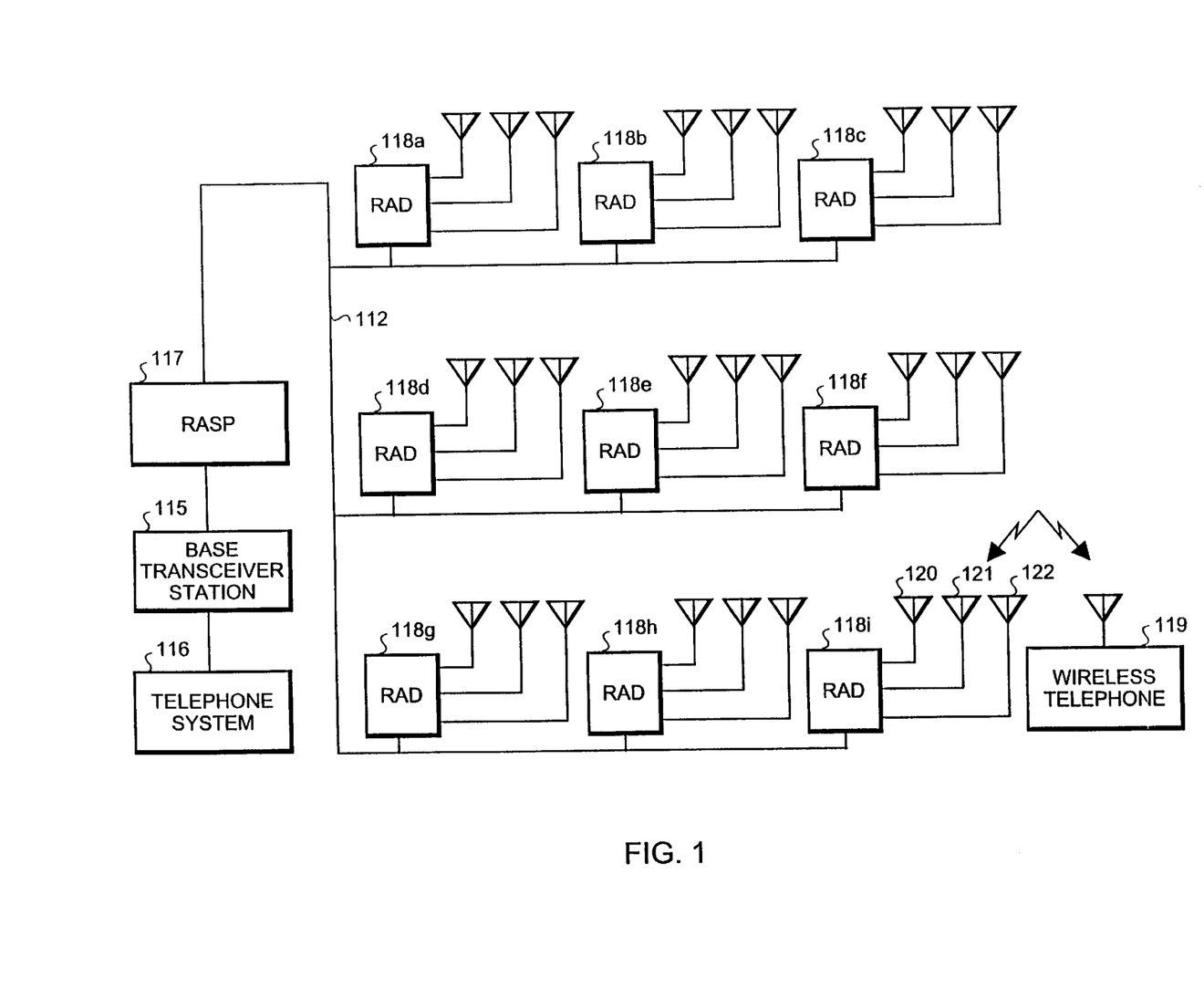
FIG. 1 is a block diagram of a wireless telephony system integrated with an exemplary broadband distribution network.

In FIG. 1 is shown a simple block diagram of an exemplary broadband distribution network 112 integrated with a wireless telephone system which includes a plurality of remotely located transceivers known as Remote Antenna Drivers (RADs) 118. There are different types of broadband distribution networks in use that may be utilized with the present invention. Such networks may utilize coaxial cable and fiber optic cable. In the embodiment of the invention disclosed herein a conventional hybrid fiber coaxial (HFC) cable distribution system is utilized of the type used for cable television distribution networks, but other types or combinations of broadband distribution networks may also be utilized. Electrical power is distributed along broadband distribution network 112 to power line amplifiers (not shown) of the broadband distribution network. This electrical power source, or alternate power sources, are used to provide power to RADs 118a–i.

Integrated with broadband distribution network 112 is a wireless telephony system in which the present invention is utilized. One such wireless telephony system is taught in U.S. patent application Ser. No. 08/695,175, filed Aug. 1, 1996, and entitled "Apparatus And Method For Distributing Wireless Communications Signals To Remote Cellular Antennas". The telephony system disclosed herein, and shown in FIG. 1, includes a base transceiver station (BTS) 115 which is connected to a telephone system 116. Base transceiver station 115 is also connected to a Remote Antenna Signal Processor (RASP) 117 which is the interface to a broadband distribution network 112. Telephony signals to be sent between telephone system 116 and wireless telephones 119 are carried via broadband network 112 using RASP 117 and Remote Antenna Drivers (RAD) 118.

As is known in the prior art, including the above cited prior art patent application, one or more frequency bands or channels of the broadband distribution network 112 are assigned to carry telephony communications and control signals between telephone system 116 and wireless telephones 119. Telephony signals originating from telephone system 116 are transmitted by RASP 117, in frequency division multiplexing format, via broadband network 112 to a plurality of remote antenna drivers (RADs) 118a–i which are connected to broadband distribution network 112. Telephony signals originating at wireless telephones 119 are frequency multiplexed together by RADs 118a–i and are transmitted along with control and gain tone signals via broadband network 112 to RASP 117, and thence to base transceiver station 115 and telephone system 116.

In base transceiver station 115 there are a plurality of transceiver modules (not shown), as is known in the wireless telephony art, each of which operates at a single channel frequency at a time, and which can handle a predetermined maximum number of telephone calls from wireless telephones. In the wireless telephone system described and claimed herein, the frequency that the RADs 118 are assigned to operate at must correspond to the operating frequency of the assigned BTS transceiver module. If a particular RAD 118 is re-assigned to function with a different transceiver module within base transceiver station 115, circuit settings within the particular RAD 118 must be changed to function with the different transceiver module. In the wireless telephony art, transceiver modules in the base transceiver station are also referred to as channel card modules and radio modules.

When wireless telephony traffic in a first sector or cell increases to the point where adequate service is not provided to wireless telephone subscribers in the first sector or cell, like during rush hour traffic on a highway, in accordance with the teaching of the present invention the wireless telephone system may be remotely reconfigured by RASP 117 to reassign one or more RADs 118 from one or more nearby sectors or cells, where those RADs 118 have overlapping signal coverage with the first sector or cell, to handle the excess wireless telephony traffic in the first sector cell.

In FIG. 1 are shown three rows of RADs 118. Typically a number of RADs 118 are spaced along, and connected to, broadband distribution network 112 to provide overlapping signal transmission and reception coverage for the entire wireless telephone system. Some of the RADs 118 are physically located near the boundary between two or more cells or sectors and, depending on the frequency of operation they are set to, can be used to handle wireless telephony traffic in one or more of the sectors or cells. Let us assume that RADs 118g,h,i in the bottom row are physically located along broadband distribution system 112 and are configured to handle wireless telephony traffic in a first sector that includes a highway. During early morning and late afternoon every work day there is rush hour traffic that creates peak wireless telephone traffic that causes unacceptable service delays in the first sector. Let us also assume that the RADs 118d,e,f in the middle row in FIG. 1 are configured and located to handle wireless telephone traffic in a second, adjacent sector but they each have an area of signal operation that overlaps the highway in the first sector.

One or more of RADs 118d,e,f may be dynamically reassigned by RASP 117 to the first sector to handle the increased telephony traffic originating from the highway. In addition, as necessary, additional RASP 117 channels may be assigned, and additional modules in base transceiver station 115 may be assigned to handle the excess wireless telephony traffic from the first sector. To do this RASP 117 sends control signals to the selected remote RADs d,e,f which will cause the frequency at which they operate to be changed to match the frequency of RADS 118g,h,i that are normally assigned to handle wireless telephone traffic in the first sector. At the end of the peak traffic period RASP 117 may send control signals to the previously reallocated ones of RADs 118d,e,f to change the frequency at which they operate back to their original settings so they are reassigned to handle wireless telephony traffic in the second sector. However, the re-assignment may be permanent depending on traffic patterns encountered.

Typically there are a number of RADs 118a–i spaced along and connected to broadband distribution network 112 to provide overlapping signal transmission and reception coverage for the entire wireless telephone system. Each RAD 118 has antennas 120, 121, 122 used to transmit to and receive signals from remote wireless telephones 119. Antenna 120 is used to transmit telephony signals to wireless telephones 119, while antennas 121 and 122 are used to receive telephony signals from wireless telephones 119. Antenna 121 is called the primary antenna, and antenna 122 is called the diversity antenna. Antennas 121 and 122 are physically spaced and cooperate to minimize signal fading and thereby provide continuous signal reception from wireless telephones 119.

Figure 2:
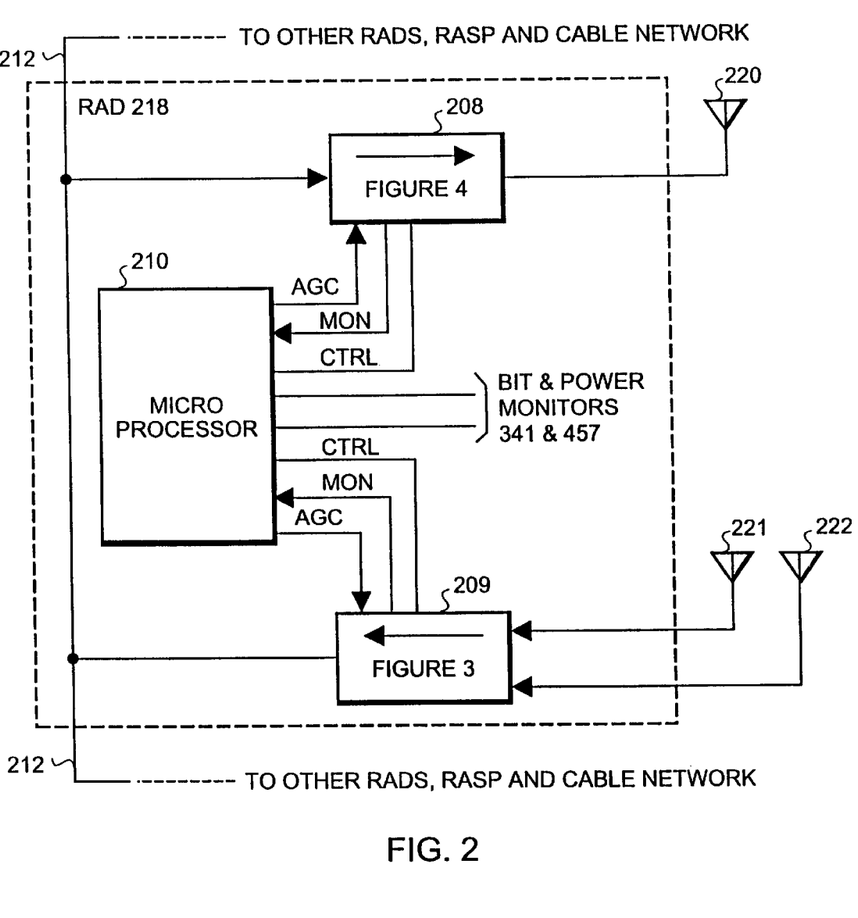
FIG. 2 is a simplified block diagram of a remote transceiver used with the wireless telephony system.

In FIG. 2 is shown a general block diagram of Remote Antenna Driver (RAD) 218. There is a first circuit 208 of RAD 218 that receives telephony signals originating at telephone system 116 and carried via RASP 117, broadband network 212, and transmits them via antenna 220 of a RAD 118 to a remote wireless telephone 119 (not shown). There is also a second circuit 209 of RAD 218, that is shown in detail in FIG. 3, that receives telephony signals originating at a wireless telephone 119, and transmits them via broadband distribution network 212 to RASP 117, and thence to base transceiver station 115 and telephone system 116.

RAD circuits 208 and 209 are connected to and controlled by a microprocessor 210. Frequency multiplexed with the telephony signals carried between RASP 117 and each of RADs 218a–i are signals for controlling gain control circuitry in each of remote RADs 218a–i in accordance with the teaching of the present invention. The gain control circuitry in RAD circuit 209 is controlled by RASP 117 to adjust its output signal level so that the power level of telephony signals input to RASP 117 is within a relatively narrow range acceptable to RASP 117. This is repeated for all remotely located RADs 118a–i distributed along and connected to the broadband distribution network 212.

Microprocessor 210 sends a control signal via lead AGC to RAD circuit 209 which causes the output of an oscillator 342 (gain tone signal), with known signal level, to be combined with any telephony signals and transmitted to RASP 117 via broadband distribution network 112.

The gain tone signal level is of a low amplitude that does not interfere with the telephony signals with which it is mixed, but is separated from the telephony signals at RASP 117. RASP 117 analyzes the amplitude of the received gain tone signal, which will reflect gains and losses in RAD 218 and broadband distribution network 212, as part of a determination whether or not to change attenuator 330a, 330b and 336 settings in RAD 218. This operation is repeated for each remotely located RAD 218 so that the power level of telephony signals input to RASP 117 is within a relatively narrow range acceptable to RASP 117.

After processing the gain tone signal received along with telephony signals from each of the RADs 218 to determine if the signal levels are too low or too high, RASP 117 sends a gain tone control signal back to each RAD 218 in which the signal level has to be adjusted. This control signal is received by microprocessor 210 on leads CTRL from RAD circuit 208. Microprocessor 210 responds to the gain tone control signal received from RASP 117 to send an AGC adjustment signal via leads AGC to RAD circuits 208 and 209. In RAD circuit 209 the AGC adjustment signal results in changes being made to attenuators in circuit 209, as described in greater detail with reference to FIG. 3, to adjust the signal level of the telephony signals that are received by RASP 117. This adjustment accounts for losses and gains not only in RAD 218, but also in broadband distribution network 212. In this manner the power level of signals received by RASP 117 from all RADs 218a–i are within a relatively narrow range acceptable to RASP 117.

RAD 218 may also receive an interrogation control signal at any time from RASP 117 which causes microprocessor 210 to send information about RAD 218 back to RASP 117. This information includes the settings of attenuator pads 330a, 330b and 336, the temperature at which each RAD 218 is operating, and other information. The information listed in the last sentence is used by RASP 117 in making decisions regarding controlling the signal level of each RAD 218.

Figure 3:
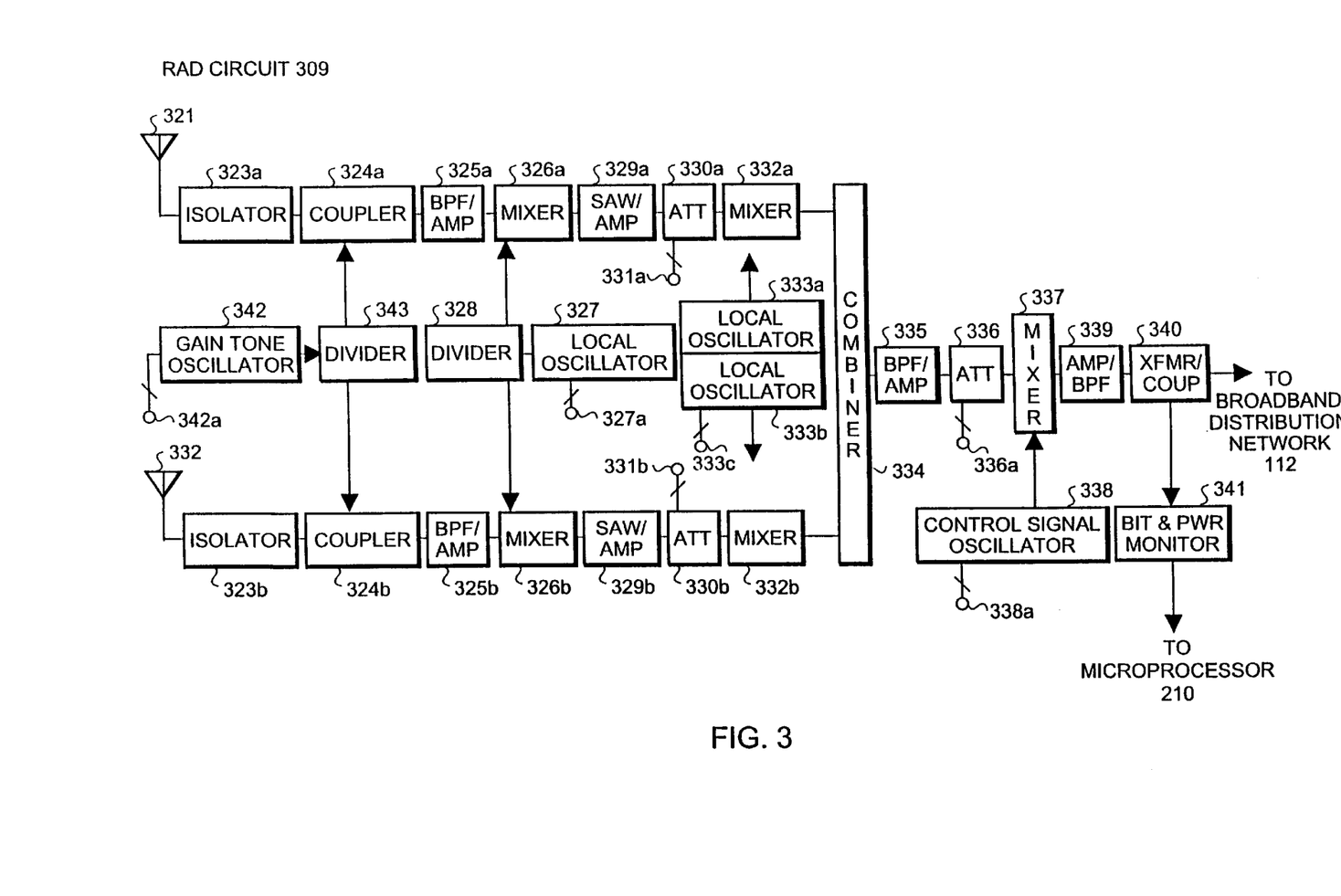
FIG. 3 is a detailed block diagram of the portion of a remote transceiver that transmits telephony signals received from wireless telephones, and sent via a broadband distribution network to a central transceiver; and the remote transceiver has gain control circuitry that is remotely controlled by the central transceiver.

In FIG. 3 is shown a detailed block diagram of RAD circuit 309 within novel, Remote Antenna Driver (RAD) 118, 218 that carries telephony signals from a wireless telephone 119, via broadband distribution network 112, to RASP 117 and base transceiver station 115. This circuit is shown as RAD circuit 209 in FIG. 2.

Briefly, primary receive antenna 321 is connected to a first portion of the circuitry in FIG. 3, and that circuitry is identical to a second portion of the circuitry that is connected to diversity receive antenna 322. The telephony signals received by both antennas 321 and 322 from a wireless telephone 119 (not shown in FIG. 3) are initially processed in parallel, then the two signals are frequency multiplexed together and are both returned via broadband distribution network 112 to remote RASP 117. This operation is described in the following paragraphs.

Telephony signals from a wireless telephone 119 (not shown) are received by primary receive antenna 321. These signals are input to an isolator 323a which isolates antenna 321 from RAD circuit 309. The telephony signal is then input to directional coupler 324a that has a second signal input thereto from power divider 343 which is the aforementioned low level, gain tone signal that is used for gain control purposes in accordance with the present invention.

Gain Tone Oscillator 342 is controlled at its input 342a by microprocessor 210 which is responsive to control signals from RASP 117. The analog gain tone signal output from gain tone oscillator 342 is at a known amplitude and is mixed with the telephony signal which is a digital, spread spectrum format that is well known in the art. It is this gain tone signal that is detected at RASP 117, processed and used to make a decision to change the settings of attenuators 330a, 330b and 336.

The telephony signal received from remote wireless telephone 119 and the low level gain tone signal are applied via directional coupler 324a to a combined band pass filter and amplifier 325a. The signals are amplified and extraneous signals are filtered from the received telephony signal.

The amplified and filtered telephony and gain tone signals are then input to mixer 326a which is the first of two heterodyning stages used to convert the carrier frequency of the telephony signal to the selected carrier frequency for transmission over broadband distribution network 112 to Remote Antenna Signal Processor (RASP) 117, shown in FIG. 1. Mixer 326a also has input thereto a signal from local oscillator 327. The first heterodyning signal from local oscillator 327 is input to power divider 328 which applies the signal from local oscillator 327 to both mixers 326a and 326b while providing isolation between these two mixers.

The operation of mixer 326a results in multiple frequencies being output from the mixer as is known in the art. All these signals are input to narrow pass band SAW filter and amplifier 329a which selects only the desired frequency carrier modulated by the gain tone and telephony signals created by mixer 326a, and amplifies same.

The frequency shifted carrier modulated by the telephony signal is then input to step attenuator 330a which is used to adjust the gain level of the signal in one-half dB steps as part of the implementation of the present invention. The amount of attenuation provided by step attenuator 330a is controlled by a binary word at its control input 331a from microprocessor 210. Microprocessor 210 controls the settings of step attenuators 330a, 330b and 336 responsive to the AGC gain control signals received from RASP 117 as previously described. This assures that the power level of all telephony signals received by RASP 117 from all RADs 218a–i are within the relatively narrow range acceptable to RASP 117.

The gain tone and telephony signals output from step attenuator 330a are input to mixer 332a along with a fixed frequency signal from local oscillator 333a. Mixer 332a is the second of the aforementioned two heterodyning stages. However, the frequency of local oscillator 333a is different from the frequency of local oscillator 333b. The result is that the carrier frequency of the telephony signal output from mixer 332a is different than the carrier frequency output from mixer 332b.

The telephony signals received by primary antenna 321 and diversity antenna 322, each now at a different carrier frequency, and the gain tone signal combined therewith, are combined into one composite signal by combiner 334. The combined signals are first filtered by band pass filter and amplifier 335 and then input to step attenuator 336 to give a final adjustment to the signal level of these combined signals. Similar to the operation of the previously described step attenuators, this digitally controlled attenuator 336 is set by microprocessor 210 responsive to a gain control signal received from remote RASP 117 as part of the novel gain control operation.

The frequency multiplexed telephony signals output from step attenuator 336 are input to signal combiner 337 which has a second input from control signal oscillator 338. The frequency of control signal oscillator 338 is controlled by a binary signal on control leads 338a from microprocessor 210 to set the frequency of the oscillator. RASP 117 is the origin from which a control signal is received to set the frequency of control signal oscillator 338. The frequency chosen is to fall within the band of frequencies used for the telephony signals received via the primary and the diversity antennas.

Responsive to different control signals received from RASP 117, microprocessor 210 (FIG. 2) sends signals on control inputs 338a. These microprocessor 210 signals cause control signal oscillator 338 to produce an information signal. The information signal indicates various information about RAD 218, but particularly including the settings of step attenuators 330a, 330b and 336, to RASP 117 as part of the novel gain control operation. RASP 117 uses this information to keep an updated status regarding each of the RADs 118a–i.

The output from combiner 337 now has multiple telephony and gain tone signals frequency multiplexed to be returned via broadband network 112 to RASP 117. The signals are the telephony signals received by antennas 321 and 322, the gain tone signal used as part of the present invention, and the system information signal output from control signal oscillator 338. This frequency multiplexed signal output from combiner 337 is input to band pass filter and amplifier 339 to amplify the signal and to remove any extraneous signals before the signal is coupled to broadband distribution network 112 and sent to RASP 117 for processing. In addition, per the teaching of the present invention, the signal power level of the telephony signal is such that when it is received at RASP 117 it is within the relatively narrow range acceptable to RASP 117.

Transformer and coupler 340 is used to couple the frequency multiplexed signals described in the last paragraph to broadband distribution network 112. The transformer is an impedance matching transformer having 50 ohm primary and 75 ohm secondary windings. When broadband distribution network 112 uses coaxial cable, the secondary winding of transformer 340 is wired in series with the center conductor of the video distribution coaxial cable. As previously described, RAD 218 hangs from the coaxial cabling of the broadband distribution network 112 to which it is connected. In other applications, such as with fiber optic cable, other well known frequency conversion and signal coupling techniques are used.

Figure 4:
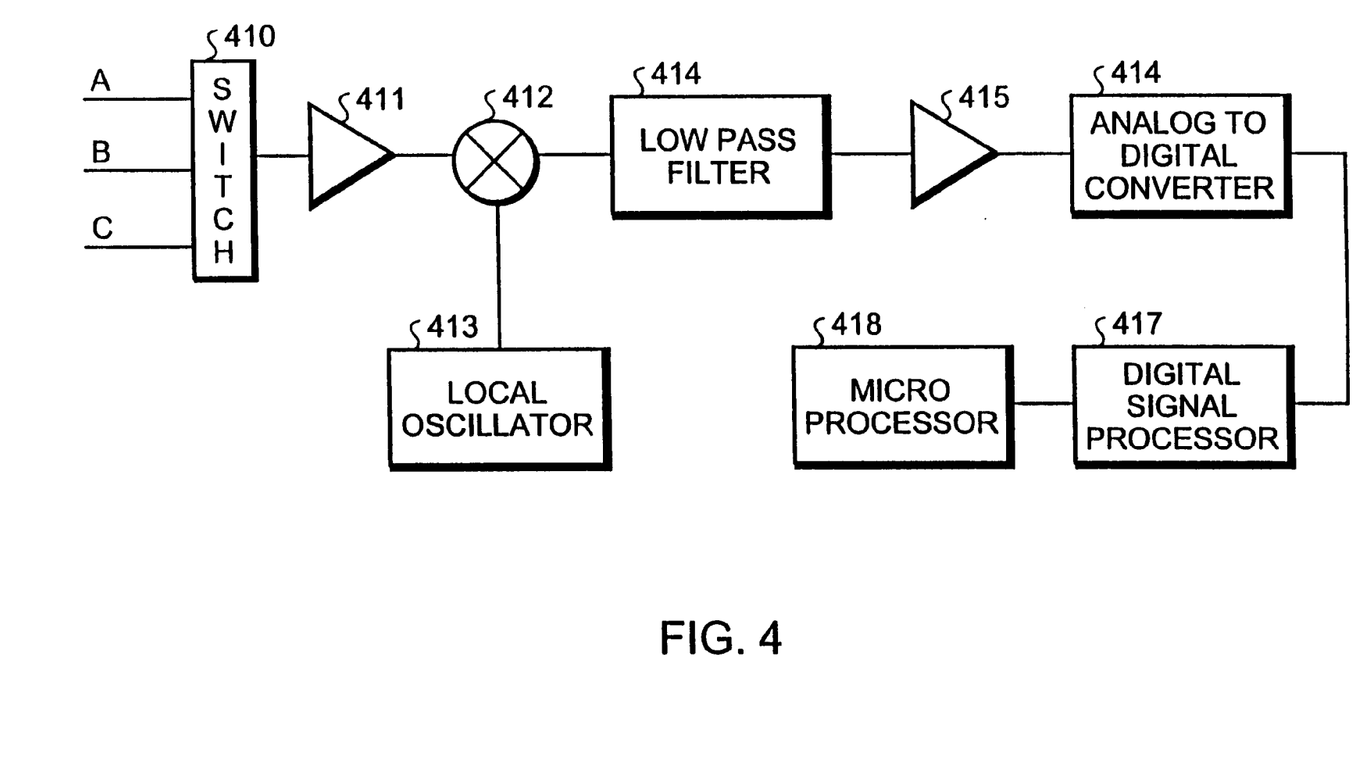
FIG. 4 is a block diagram of a portion of a central transceiver that is used to monitor the signal gain of a gain tone received from each of a plurality of remote transceivers along with telephony signals, and send control signals to each remote transceiver to adjust its signal gain.

In FIG. 4 is shown a block diagram of the circuitry in RASP 117 that is used to monitor the gain tone mixed with telephony and control signals received by RASP 117 from all RADs 118a–i via broadband distribution network 112. There are three inputs shown to RF switch 410, designated A, B and C. Each of these inputs is connected to receive signals from RADs 118 on one sector of broadband distribution network 112. All RADs 118 on one sector carry telephony signals at a first carrier frequency. Thus, input A will receive telephony signals that have a first carrier frequency, input B will receive telephony signals that have a second carrier frequency, and input C will receive telephony signals that have a third carrier frequency. Thus, with reference to FIG. 1 as an example, RADs 118a–c may all be on one sector and their carrier signal is connected to input A of the circuit in FIG. 4, RADs 118d–f may all be on a second sector and their carrier signal is connected to input B of the circuit in FIG. 4, and RADs 118g–i may all be on a third sector and their carrier signal is connected to input C of the circuit in FIG. 4. In addition, all the RADs 118 in each sector can simultaneously handle multiple calls, and additional sectors are defined to handle additional traffic. If additional wireless telephony traffic must be handled, and more than three sectors are required, an additional RASP 117 must be provided, and some RADs 118 must be re-allocated to function with the additional RASP 117.

To provide signals to the A, B and C inputs, RASP circuit 208 has receiver circuitry connected to each of the three inputs that receives telephony and control signals transmitted over broadband distribution network 112 from RADs 118. The receiver circuits are not shown, but each comprises an input filter followed by a signal divider that applies a portion of the received signal to the A, B and C inputs of the RASP 117 circuit shown in FIG. 4.

Switch 410 is an RF switch that is periodically operated by microprocessor 418 to connect individual ones of inputs A, B and C to the remainder of the circuitry in FIG. 4. Thus, the portion of circuitry past switch 410 has input thereto, on an individual basis, the multiplexed telephony signals from all RADs 118 within a sector to which it is connected at each moment in time. The telephony signal from each RAD 118 has a spread spectrum, digitized telephony signal and the analog gain tone signal. The received composite signal from all RADs 118 within a sector is first amplified by amplifier 411 and then input to mixer 412 along with the output from local oscillator 413. The standard heterodyning process of mixer 412 also produces a number of spurious signals. The output of mixer 412 is input to low pass filter 414 centered around the gain tone which filters out most of the spread spectrum signal and the spurious signals from the mixing process. This increases the relative level of the gain tone received from each RAD 118 with respect to the remaining energy of the telephony signal. The resultant signal is then amplified at amplifier 415 and input to analog to digital converter 416 to change the remaining signal to a digital signal which is input to digital signal processor 417 for further processing. The further processing that is performed by digital signal processor 417 in digital form are the same steps that have just been described for the analog circuits in FIG. 4. The digital signal that is input to digital signal processor 417 is digitally heterodyned and low pass filtered to get rid of more, but not all of the remaining telephony signal. The result is that the gain tone signal now has a 30 dB gain with respect to the telephony signal, as compared to the initial power ratios generated by the RADs 118.

The gain tone signal from the RADs 118 in a sector is processed by microprocessor 418 and its signal level is compared against a standard signal level. If the amplitude of the gain tone signal is too low, microprocessor 418 causes a gain control signal to be sent back over distribution network 112 to the particular RAD 118 that has the too low gain tone. This control signal has an address pre-fixed thereto which causes only the particular RAD 118 to receive the gain tone control signal. Microprocessor 210 (FIG. 2) in the particular RAD 118 responds to the gain tone control signal and causes a signal to be output on lead AGC to circuit 209 (FIG. 3). The AGC signal is applied to the digital control inputs of step attenuators 330a, 330b and 336 and causes the attenuation they insert into the circuit to be decreased. The effect is to increase the power level of the telephony signals and gain tone from gain tone oscillator 342 that is combined with the telephony signal and received by the circuit in FIG. 4.

If the amplitude of the gain tone is too high microprocessor 418 causes a gain control signal to be sent back over distribution network 112 to the particular RAD 118 that has the too high gain tone. This gain control signal has an address pre-fixed thereto which causes only the particular RAD 118 to receive the gain control signal. Microprocessor 210 (FIG. 2) in the particular RAD 118 responds to the gain control signal and causes a signal to be output on lead AGC to circuit 209 (FIG. 3). The AGC signal is applied to the digital control inputs of step attenuators 330a, 330b and 336 and causes the attenuation they insert into the circuit to be increased. The effect is to decrease the power level of the telephony signal and gain tone transmitted over broadband distribution network 112 to RASP 117 including the circuit shown in FIG. 4.

If the gain tone signal level received and analyzed by the RASP 117 circuit in FIG. 4 is correct, no gain control signals are sent to the particular RAD 118 to modify the settings of the step attenuators 330a, 330b and 336. As previously described, RAD 118 reports the settings of its attenuators and other circuits to RASP 117 using control signal oscillator 338.

While what has been described hereinabove is the preferred embodiment of the gain control operation over a broadband distribution network, it can be understood that numerous changes may be made to the gain control circuitry in RAD 218 and RASP 117 by those skilled in the art without departing from the scope of the invention.

What is claimed is:

1. In a wireless telephone system that utilizes a plurality of remote transceivers to carry telephony signals between wireless telephones and a central transceiver over a broadband distribution network, and each of said remote transceivers receives control signals from said central transceiver, apparatus in said central transceiver for monitoring and adjusting the gain level of signals sent from each of the plurality of remote transceivers to the central transceiver so that the signal level from each of said remote transceivers is substantially the same at the input of said central transceiver, said apparatus comprising:

means in said central transceiver for receiving a gain tone that is sent along with said telephony signals received from ones of said remote transceivers, the gain tone being set to a fixed predetermined amplitude at each one of said remote transceivers prior to transmission over the broadband distribution network; and means in said central transceiver responsive to said received gain tone from said ones of said remote transceivers for determining a relative amplitude level of each said received gain tone, and in response thereto sending a gain control signal to corresponding ones of said remote transceivers which causes the adjustment of the gain level of signals output from said corresponding ones of said remote transceivers to both the wireless telephones and the central transceiver.

2. The invention in accordance with claim 1 wherein said means in said central transceiver for receiving said gain tone from ones of said remote transceivers comprises:

means for separating said gain tone from said telephony signals received from said ones of said remote transceivers; and means for analyzing said gain tone received from said remote transceivers to determine if the gain tone signal level is above or below a predetermined level.

3. The invention in accordance with claim 2 wherein said means for separating said gain tone from said telephony signals received from said remote transceivers comprises filter means.

4. A method for monitoring and adjusting the gain level of each of a plurality of remote transceivers that carry signals between wireless telephones and a central transceiver over a broadband distribution network, so that the gain level of signals output from each of said remote transceivers and present at the input of said central transceiver is substantially the same, said method comprising the steps of:

receiving in said central transceiver a gain tone that is sent along with telephony signals transmitted from ones of said remote transceivers, the gain tone being set to a fixed predetermined amplitude at each one of said remote transceivers prior to transmission over the broadband distribution network; and determining a relative amplitude level of each said received gain tone, and in response thereto returning a control signal from said central transceiver to corresponding ones of each of said remote transceivers which causes the adjustment of the gain level of signals output from said corresponding ones of said remote transceivers to both the wireless telephones and the central transceiver.

5. The method in accordance with claim 4 further comprising the steps of:

analyzing the gain tone received at said central transceiver from each of said remote transceivers to determine if its signal level is above or below a predetermined signal level; and determining the value of said control signal to be returned to said corresponding ones of said remote transceivers which causes the adjustment of the gain level of signals output from said corresponding ones of said remote transceivers.

6. The method in accordance with claim 5 further comprising the step of separating said telephony signal from said gain tone in said central transceiver before analyzing said gain tone to determine if its signal level is above or below said predetermined signal level.

7. In a wireless telephone system that utilizes a plurality of remote transceivers to carry telephony signals between wireless telephones and a central transceiver over a broadband distribution network, and each of said remote transceivers receives control signals from said central transceiver, apparatus for monitoring and adjusting the gain level of signals output from each of the plurality of remote transceivers to the central transceiver so that the signal level output from each of said remote transceivers is substantially the same at the input of said central transceiver, said apparatus comprising:

means in each of said remote transceivers for transmitting a gain tone along with said telephony signals output from each of said remote transceivers for transmission to said central transceiver via said broadband distribution network, the gain tone being set to a fixed predetermined amplitude at each one of said remote transceivers prior to transmission over the broadband distribution network;

means in said central transceiver for receiving said gain tone from each one of said remote transceivers;

means in said central transceiver responsive to said received gain tone from each of said remote transceivers for determining a relative amplitude level of each said received gain tone, and in response thereto sending a control signal to ones of said remote transceivers the output signal gain level of which is above or below a predetermined level;

means in each of said remote transceivers for receiving said control signal directed to it from said central transceiver; and means in each of said remote transceivers for adjusting the gain level of signals output therefrom responsive to said control signal to both the wireless telephones and the central transceiver.

8. The invention in accordance with claim 7 wherein said means for receiving said gain tone from each of said remote transceivers comprises:

means for separating said gain tone from said telephony signals received from each of said remote transceivers; and means for analyzing said gain tone received from each of said remote transceivers to determine if the gain tone signal level is above or below a predetermined level.

9. The invention in accordance with claim 8 wherein said means for adjusting the gain level of signals comprises:

gain control means through which said telephony signals and said gain tone signal pass on their way to said central transceiver; and means responsive to said control signal for changing the operation of said gain control means so that the gain level of signals output from each of said remote transceivers and present at the input of said central transceiver is substantially the same.

10. The invention in accordance with claim 9 wherein said means for separating said gain tone from said telephony signals received from said remote transceivers comprises filter means.

11. The invention in accordance with claim 10 wherein said gain control means comprises amplifier and attenuator means.

12. A method for monitoring and adjusting the gain level of each of a plurality of remote transceivers that carry telephony and other signals between wireless telephones and a central transceiver via a broadband distribution network, so that the gain level of signals output from each of said remote transceivers and present at the input of said central transceiver is substantially the same, said method comprising the steps of:

transmitting a gain tone along with said telephony signals output from each of said remote transceivers for transmission to said central transceiver via said broadband distribution network, the gain tone being set to a fixed predetermined amplitude at each one of said remote transceivers prior to transmission over the broadband distribution network;

receiving a gain tone along with telephony signals in said central transceiver from each of said remote transceivers;

determining a relative amplitude level of each said received gain tone, and in response thereto sending a control signal from said central transceiver to corresponding ones of each of said remote transceivers which causes the adjustment of the gain level of signals output therefrom;

receiving a control signal at said corresponding ones of said remote transceivers and sent to it from said central transceiver; and changing the gain level of signals output from each of said remote transceivers responsive to said control signal directed to both the wireless telephones and the central transceiver.

13. The method in accordance with claim 12 further comprising the steps of:

analyzing said gain tone received at said central transceiver from each of said remote transceivers to determine if its signal level is above or below a predetermined signal level; and determining the value of said control signal to be returned to said corresponding ones of said remote transceivers which causes the adjustment of the gain level of signals output from said corresponding ones of said remote transceivers.

14. The method in accordance with claim 13 further comprising the step of separating said telephony signal from said gain tone in said central transceiver before analyzing said gain tone to determine if its signal level is above or below said predetermined signal level.

* * * * *